United States Patent [19]

Eastmond et al.

[11] Patent Number: 5,617,008
[45] Date of Patent: Apr. 1, 1997

[54] METHOD, APPARATUS, AND COMMUNICATION DEVICE FOR CHARGING A CHARGE STORAGE DEVICE WHICH IS MOMENTARILY CONNECTED TO A FIXED LOAD

[75] Inventors: Bruce C. Eastmond, Downers Grove; Rachid M. Alameh, Schaumburg, both of Ill.

[73] Assignee: Motorola, Inc., Schaumburg, Ill.

[21] Appl. No.: 492,552

[22] Filed: Jun. 20, 1995

[51] Int. Cl.$^6$ ................................................. H01M 10/46
[52] U.S. Cl. ................................. 320/22; 320/43; 320/44
[58] Field of Search ................................ 320/5, 21, 22, 320/30, 35, 39, 43, 44, 48

[56] References Cited

U.S. PATENT DOCUMENTS

| 4,153,867 | 5/1979 | Jungfer et al. | 320/43 X |
| 4,455,523 | 6/1984 | Koenck | 320/43 |
| 4,803,416 | 2/1989 | Abiven et al. | 320/44 |
| 4,912,392 | 3/1990 | Faulkner | 320/44 |
| 4,914,393 | 4/1990 | Yoshido | 320/48 X |
| 5,107,191 | 4/1992 | Lowndes et al. | 320/48 X |
| 5,117,173 | 5/1992 | Oliva et al. | 320/43 X |
| 5,136,620 | 8/1992 | Eaves | 320/48 X |

OTHER PUBLICATIONS

"NiMH and NiCd rechargeable battery management", Philips Semiconductors, May, 1993.

*Primary Examiner*—Edward Tso
*Attorney, Agent, or Firm*—Darleen J. Stockley

[57] ABSTRACT

The present invention provides a method (100), an apparatus (400), and a communication device (700) for automatically maintaining a state of full charge in a charge storage device, such as a secondary battery (414), to which a fixed load (412) is momentarily connected. Since the load is fixed, a predetermined amount of charge is removed from the charge storage device each time the load is connected. A counter (404) is incremented while the load (412) is connected. From the count, the amount of charge that must be replaced can be determined. As the charge is replaced the count is decremented.

12 Claims, 5 Drawing Sheets

METHOD, APPARATUS, AND COMMUNICATION DEVICE FOR CHARGING A CHARGE STORAGE DEVICE WHICH IS MOMENTARILY CONNECTED TO A FIXED LOAD

FIELD OF THE INVENTION

The present invention relates generally to charging systems, and more particularly to charging a charge storage device which is momentarily connected to a fixed load.

BACKGROUND OF THE INVENTION

There is an emerging market for two-way wireless data transceivers to be used with battery-operated, portable host devices such as laptop computers and "personal digital assistants". Such wireless transceivers permit data to be exchanged among host devices in a packet format, consisting of a predetermined number of data bits, as well as other bits which are used in housekeeping functions such as clock recovery and error detection and/or correction. When a packet is sent, the transceiver transmitter operates momentarily, followed by a time period of a much longer duration when the transceiver is either receiving or idle. The current peak drawn when the transmitter is active is much larger than the current drawn when the transceiver is receiving or idle. Power for the transceiver power is supplied from the host device battery, and may pass through an interface connector defined by an industry standard such as the Personal Computer Memory Card International Association, PCMCIA. The trend to lower voltage power distribution in host devices will eventually lead to an increase in the transmitter current required to maintain the same output power.

The voltage at the transceiver may be reduced to an unacceptable level when current is drawn from the host device battery due to power distribution wiring resistance and the equivalent series resistance of the host device battery itself. The resistance, R, of an electrical conductor depends on the resistivity, $\rho$, the length, I, and the cross-sectional area, A, in the following manner:

$$R = \rho \frac{1}{A}.$$

Thus, the trend toward higher printed circuit board density will increase the likelihood of higher wiring resistance. The equivalent resistance of the host device battery depends on many factors, including its chemical composition and physical parameters. Nickel cadmium (NiCd) batteries have the lowest internal resistance. Nickel metal hydride (NiMH) batteries are becoming more common in host devices since their energy density is 30% to 50% higher than NiCd, and they are environmentally safer since they do not contain poisonous cadmium; however, they have a higher internal resistance than NiCd. For a given battery type, small cells have a higher internal resistance than large cells.

It is also possible that the magnitude of the current drawn by the transmitter will exceed the limits defined for pins in the interface connector. Typical PCMCIA connectors pins are limited to 300 to 500 mA, depending on the connector design.

It is common for host devices to employ power management to disconnect the battery voltage from peripheral devices when the computer is turned off, or at other times in order to reduce current. Peripheral interfaces, such as the PCMCIA interface, do not provide for a power connection that provides a continuous connection to the battery.

A secondary battery may be safely charged in minimum time by a current having a magnitude C, the ampere-hour rating of the battery. However, overheating can occur as near full charge is reached if this current is delivered continuously. A secondary battery may be charged for several hours at a current of 0.1 C, or continuously at 0.05 C or less. All charge storage devices, including batteries, experience charge leakage at a low rate when idle. The charge lost in this manner must be replaced to maintain full capacity.

Prior-art methods for controlling the flow of charge include commercially-available battery management and remaining energy indicator ICs, and charge controllers. Such ICs are not suitable for the application described since they do not automatically initiate the charging process following disconnect of the load, or may not monitor conditions to prevent overcharging.

Accordingly, there is a need for a charge storage device and a method for controlling the flow of charge such that stored charge is transferred to a load at a predetermined rate when the load is momentarily connected, and replaced by a charging source at a lower rate immediately following disconnect of the load so that the recharging process is likely to be completed while the charging voltage is available.

DETAILED DESCRIPTION OF PREFERRED EMBODIMENTS

The present invention provides a method and apparatus for automatically maintaining a state of full charge in a charge storage device, such as a secondary battery, to which a fixed load is momentarily connected. Since the load is fixed, a predetermined amount of charge is removed from the charge storage device each time the load is connected; thus, the amount of charge that must be replaced can be determined from the duration of time that the load is connected.

The charge, $\Delta q_{DISCHARGE}$, drawn from the charge storage device when the load is connected for a time $\Delta t_{DISCHARGE}$, is given by $$\Delta q_{DISCHARGE} = i_{LOAD} \cdot \Delta t_{DISCHARGE} \quad \text{[equation 1]}$$

where $i_{LOAD}$ is the current supplied to the load. $\Delta t_{DISCHARGE}$ may be measured by incrementing a counter at a first predetermined rate, $f_1$; thus, $$\Delta t_{DISCHARGE} = \frac{1}{f_1} \cdot \Sigma \text{ DISCHARGE\_COUNT}. \quad \text{[equation 2]}$$

The charge, $\Delta q_{CHARGE}$, delivered to the charge storage device during a time when the load is disconnected, $\Delta t_{CHARGE}$, $$\Delta q_{CHARGE} = i_{CHARGE} \cdot \Delta t_{CHARGE}, \quad \text{[equation 3]}$$

where $i_{CHARGE}$ is the current supplied to the load. $\Delta t_{CHARGE}$ may be measured by incrementing a counter at a second predetermined rate, $f_2$; thus, $$\Delta t_{CHARGE} = \frac{1}{f_2} \cdot \Sigma \text{ CHARGE\_COUNT}. \quad \text{[equation 4]}$$

and $$i_{LOAD} \cdot \frac{1}{f_1} \cdot \Sigma \text{ DISCHARGE\_COUNT} = \quad \text{[equation 5]}$$

$$i_{CHARGE} \cdot \frac{1}{f_2} \cdot \Sigma \text{ CHARGE\_COUNT}.$$

The ratio of the charging current to the load current may be determined by rearranging equation 5

$$\frac{i_{CHARGE}}{i_{LOAD}} = \frac{\frac{1}{f_1} \cdot \Sigma \text{ DISCHARGE\_COUNT}}{\frac{1}{f_2} \cdot \Sigma \text{ CHARGE\_COUNT}}. \quad \text{[equation 6]}$$

The charge removed during discharge by the load has been completely replaced when $$\Sigma \text{ DISCHARGE\_COUNT} - \quad \text{[equation 7]}$$
$$\Sigma \text{ CHARGE\_COUNT} = 0;$$

thus, $$\frac{I_{CHARGE}}{I_{LOAD}} = \frac{f_2}{f_1}. \quad \text{[equation 8]}$$

Typically, $i_{CHARGE} < i_{LOAD}$; thus, $f_2 < f_1$, and the rate at which the counter counts is less when the charge storage device is receiving charge than when it is delivering charge.

The present invention may include means for replacing the charge at a slower rate when a temperature threshold is exceeded. In this case the counter will count at a rate $f_3 < f_2$.

Figure 1:
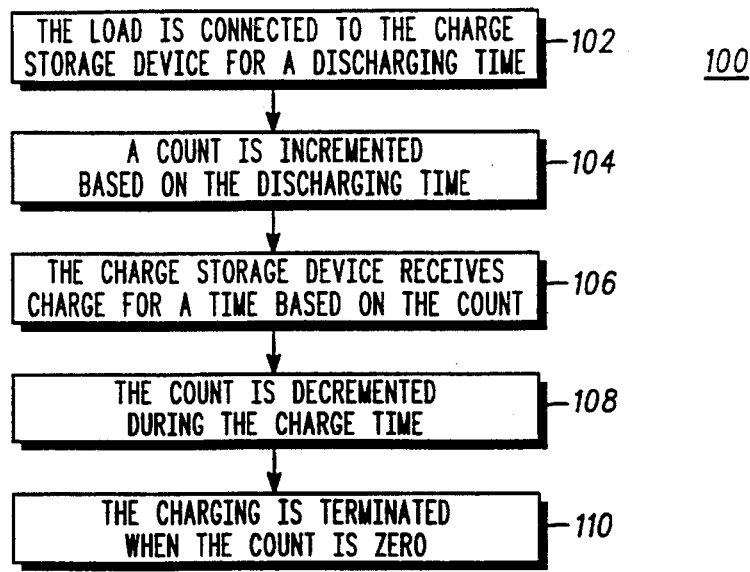
FIG. 1 is a flow diagram of one embodiment of steps for a method of controlling the flow of charge in accordance with the present invention.

FIG. 1, numeral 100, is a flow diagram of one embodiment of steps for a method of controlling the flow of charge in accordance with the present invention. The load is connected to the charge storage device for a discharging time (102). A counter is incremented based on the discharging time (104). The charge storage device receives charge for a time based on the count (106). The count is decremented during the charge time (108). The charging is terminated when the count is zero (110).

Figure 2:
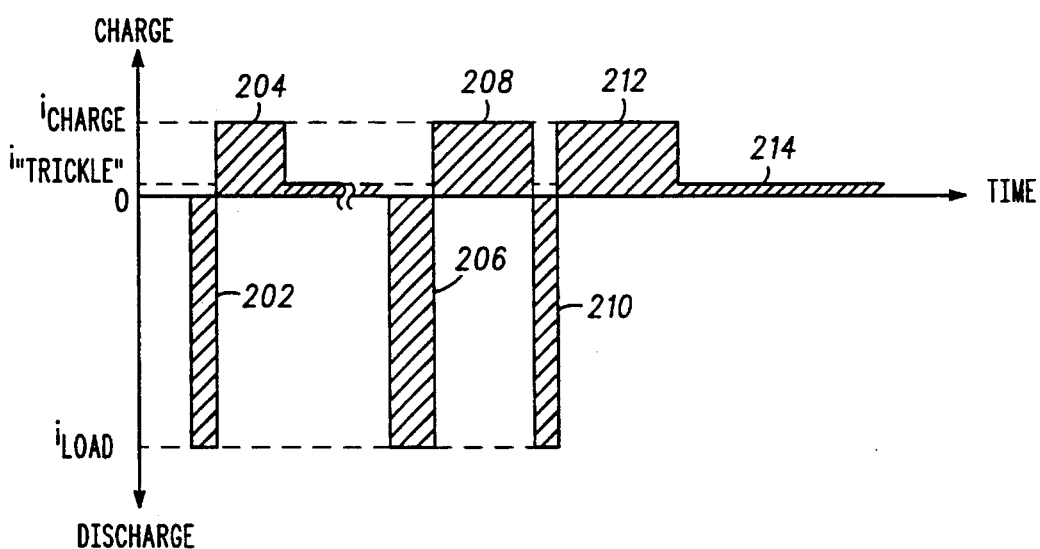
FIG. 2 is a graphical depiction of one embodiment of the flow of charge in accordance with the present invention.

FIG. 2, numeral 200, is a graphical depiction of one embodiment of the flow of charge in accordance with the present invention. Charge is transferred from the charge storage device when the load is connected, resulting in momentary discharge (202, 206, and 210). During discharge (202), the counter output increments at a corresponding rate, $f_1$ (216). During charge replacement (204), the counter output decrements at a corresponding rate, $f_2$ (218). In a similar manner, discharge (206) is followed by charge replacement (208); however, the charge replacement process is interrupted by discharge (210). Charge replacement (212) corresponds to the total of the remaining unreplaced charge from discharge (206) and the discharge (210). When the charge replacement process is completed, trickle charge (214) is activated to replace charge which may be lost due to leakage.

Figure 3:
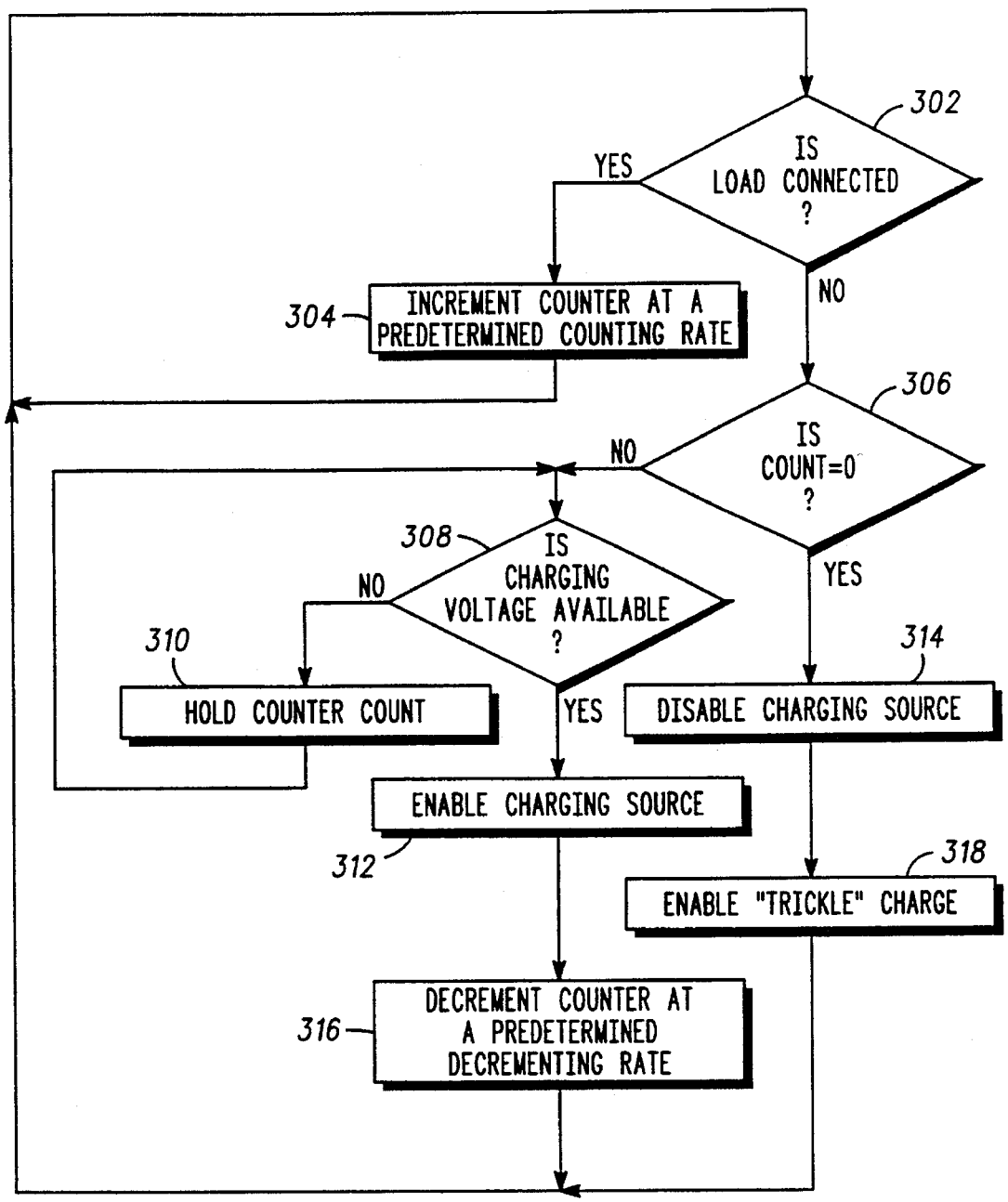
FIG. 3 is a flow diagram of a second embodiment of steps for a method of controlling the flow of charge in accordance with the present invention.

FIG. 3, numeral 300, is a flow diagram of a second embodiment of steps for a method of controlling the flow of charge in accordance with the present invention. When a load is connected to the charge storage device (302), the counter is incremented at a predetermined counting rate (304). The counter continues to count while charge is being removed.

When no load is connected (302), and the counter output is zero m(306), charging is disabled (314) and trickle charging is enabled (318) in order to replace charge lost due to leakage.

When no load is connected (302), and the counter count is non-zero (306), and the charging voltage is available (308), then the charging source is enabled (312), and the counter is decremented at a predetermined decrementing rate (316).

When no load is connected (302), and the counter count is non-zero (306) and the charging voltage is not available (308), then the counter count is held (310) until the charging voltage is available.

Figure 4:
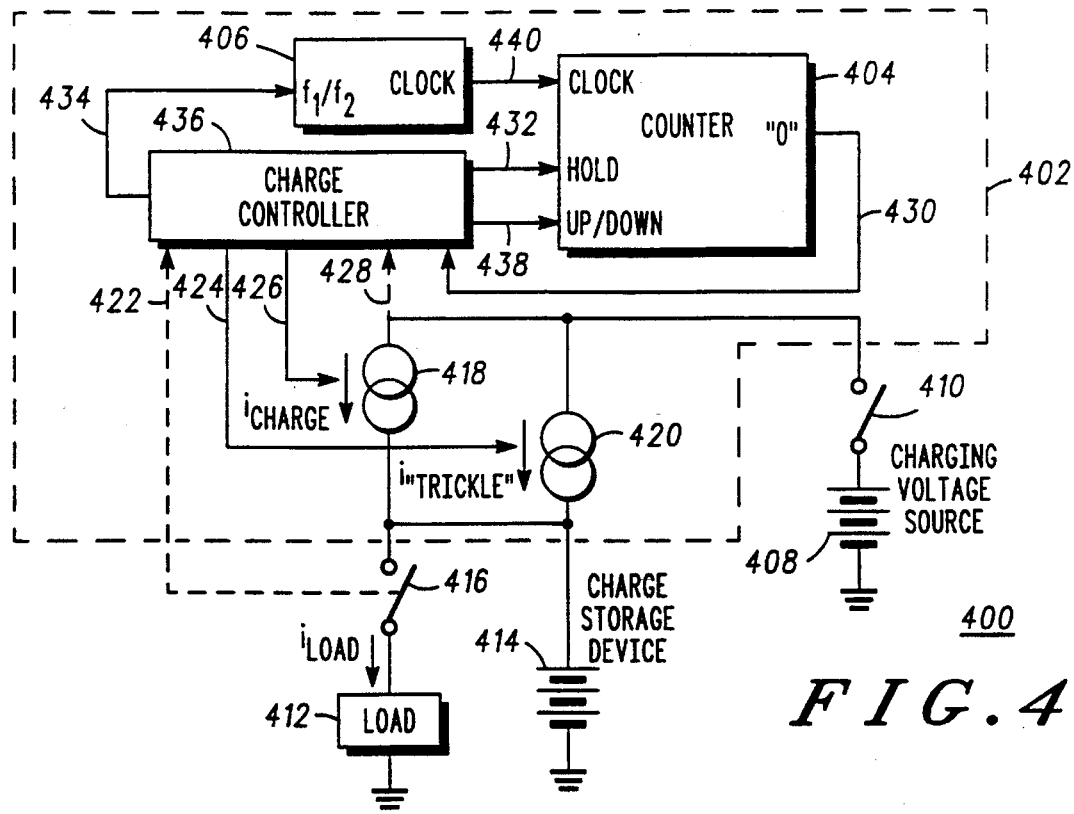
FIG. 4 is a block diagram of one embodiment of an apparatus for charging a battery in accordance with the present invention.

FIG. 4, numeral 400, is a block diagram of one embodiment of an apparatus for charging a secondary battery in accordance with the present invention. A charger (402) contains a counter (404), a clock (406), a charge controller (436), a charging current source (418), and a trickle charge source (420).

The counter (404) receives through a counter input (440) that is a clock signal generated by the clock (406). The clock signal is generated at either a first predetermined rate $f_1$, or a second predetermined rate $f_2$, as directed by the charge controller (436) through clock control input (434). The connection of a load (412) to a secondary battery (414) through a switch (416) is sensed through a load sensor input (422). A charge controller (436) drives this counter and operates on various factors in order to set the counter clock speed (440), the counter state (432), and the direction of the count (438). Such factors include the presence or absence of a load (412) by sensing (422) the state of the switch (416), The presence or absence of a charging voltage source (408) as indicated by the switch (410), and the counter output (430).

The clock (406) contains two clock frequencies $f_1$ and $f_2$. Frequency $f_1$ is the clock frequency at which the counter advances during the presence of a load. Frequency $f_2$ is the clock frequency at which the counter decrements as energy is being restored back into the charge storage device which in this case is a secondary battery (414). These two clocks are selected by the charge controller via a selection input (434) and are fed into the counter at the clock input (440). The $f_1/f_2$ ratio is set based on the knowledge of the load current which is constant in an on-off digital application, the time available for charging the battery, and the vendor's recommended battery charging characteristics.

The charging current source (418) is driven by the charge controller a source input (426) and it is enabled when the counter output is non-zero (430), the charging voltage source is available (428), and the load is disconnected (416). The current source (420) represents the trickle charge current. This source is activated by the charge controller through a trickle charge control (424) after the charging is terminated.

Figure 5:
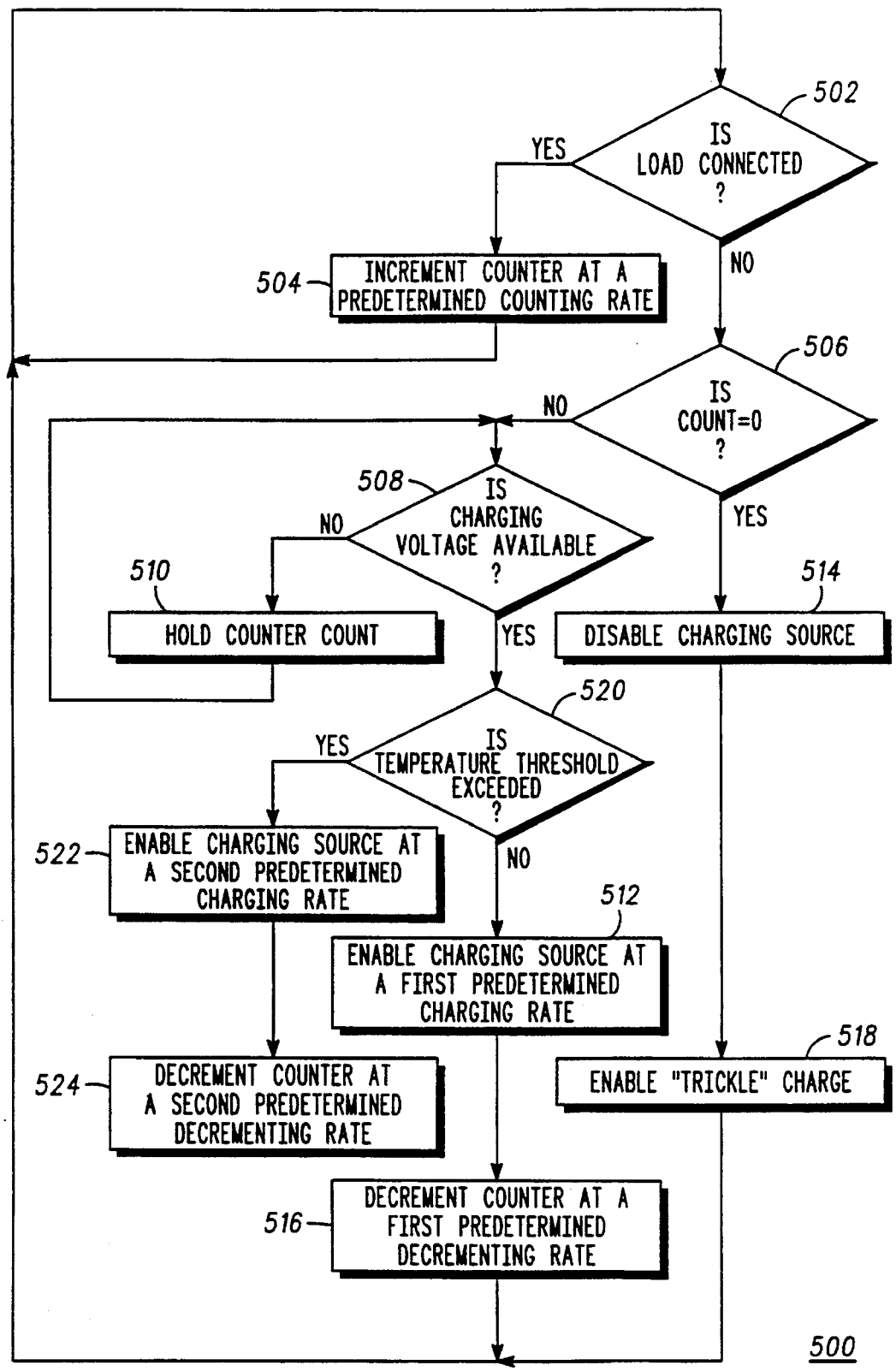
FIG. 5 is a flow diagram of a third embodiment of steps for a method of controlling the flow of charge in accordance with the present invention.

FIG. 5, numeral 500, is a flow diagram of a third embodiment of steps for a method of controlling the flow of charge in accordance with the present invention. The embodiment in FIG. 5 is similar to that in FIG. 3 except for a battery-temperature sensing scheme which sets a variable charging rate. The variable charging rate is employed to improve the battery charging efficiency as it deteriorates with the rising temperature while being charged.

The counter (502) is operably coupled to receive a load presence or absence signal. For transmitter applications, the load presence signal (502) may be the transmitted data.

First, the initial state will be analyzed where the battery is full as indicated by the zero counter output (506) and no load is present (502). In this case, charging remains disabled (514) and trickle charging is enabled (518). The trickle charge is employed in order to maintain the battery fully charged by compensating for the on going self discharge and capacity deterioration with age.

Second, a load is connected to the battery. As a result, a counter starts to increment at a predetermined counting rate in order to maintain a discharge unit record of the drained energy. When the load is terminated (502), the counter output which is now non-zero, remains in this state (510) until a charging source voltage (508) is sensed. If the temperature of the battery (520) is below a given threshold indicating normal temperature, charging commences at a first predetermined charging rate (512), and the counter begins to decrement at a first predetermined decrementing rate (516). If the battery temperature is exceeds a set threshold indicating high battery temperature, charging commences at a second predetermined charging rate (522), and the counter decrements at a second predetermined decrementing rate (524). This continues until all lost energy has been restored and the counter output is zero again.

The temperature-dependent charging rate is used to improve the charging efficiency as the battery temperature rises. Typical batteries such as NiCds begin to heat up during charging when they reach about 70% of their full capacity. Maintaining the same charging rate will cause the battery to overheat and its charging efficiency to diminish. To overcome this problem, the charge is put into the battery at a slower rate. A variable charging rate is therefore particularly useful in this case. The sensing of the battery temperature can be accomplished by a heat sensor element located within the battery pack. Typically, a charging rate reduction of an order of magnitude is adequate.

Figure 6:
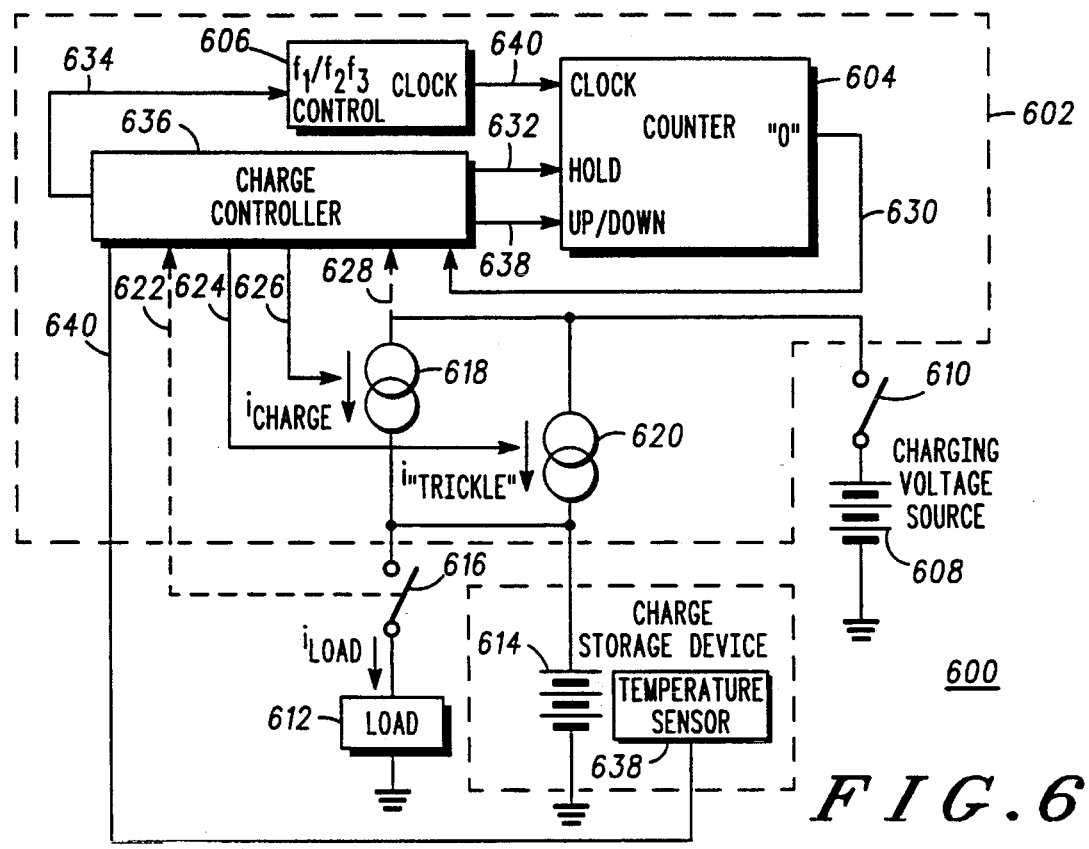
FIG. 6 is a block diagram of a second embodiment of an apparatus for charging a battery in accordance with the present invention.

FIG. 6, numeral 600, is a block diagram of a second embodiment of an apparatus for charging a battery in accordance with the present invention. FIG. 6 is similar to FIG. 4 except for the temperature dependent charging rate discussed earlier in FIG. 5.

A charger (602) contains a counter (604), a clock (606), a charge controller (636), a charging current source (618), a trickle charge source (620). The counter (604) can increment, decrement, or stay in hold while tracking the charged and discharged energy. The charge controller (636) which drive this counter operates on various factors in order to set the counter clock speed (640), the counter state (632), and the direction of the count (638). Such factors include the presence or absence of a load (612) as indicated by sensing (422) the state of the switch (616). The presence or absence of a charging voltage source (608) as indicated by the switch at (610), and the counter output (630).

The clock (606) incorporates three clock frequencies $f_1$, $f_2$, and $f_3$. Frequency $f_1$ is the clock frequency at which the counter advances during the presence of a load. Frequency $f_2$ is the clock frequency at which the counter decrements as energy is being restored back into the battery (614) at normal temperature. Frequency $f_3$ represents the clock frequency at which the counter decrements while the near-full battery is being charged at above normal temperature. The three clocks are selected by the charge controller via a selection signal (634) and are fed into the counter at a clock input (640) with $f_1 > f_2 > f_3$. The $f_1/f_2$ ratio is set based on the knowledge of the load current which is constant in an on-off digital application, the time available for charging the battery, and the vendor's recommended battery charging characteristics. The $f_2/f_3$ ratio is also battery dependent with $f_2$ being typically an order of magnitude higher.

The charging current source (618) is driven by a charge controller signal (626) and it is enabled when the counter output is non-zero (630), the charging voltage source is available (628), and the load is disconnected (616). The current source (620) represents the trickle charge current. This source is activated by a charge controller signal (624) after the charging process is terminated. A battery heat sensing element (638) drives a second charge controller signal (640).

Figure 7:
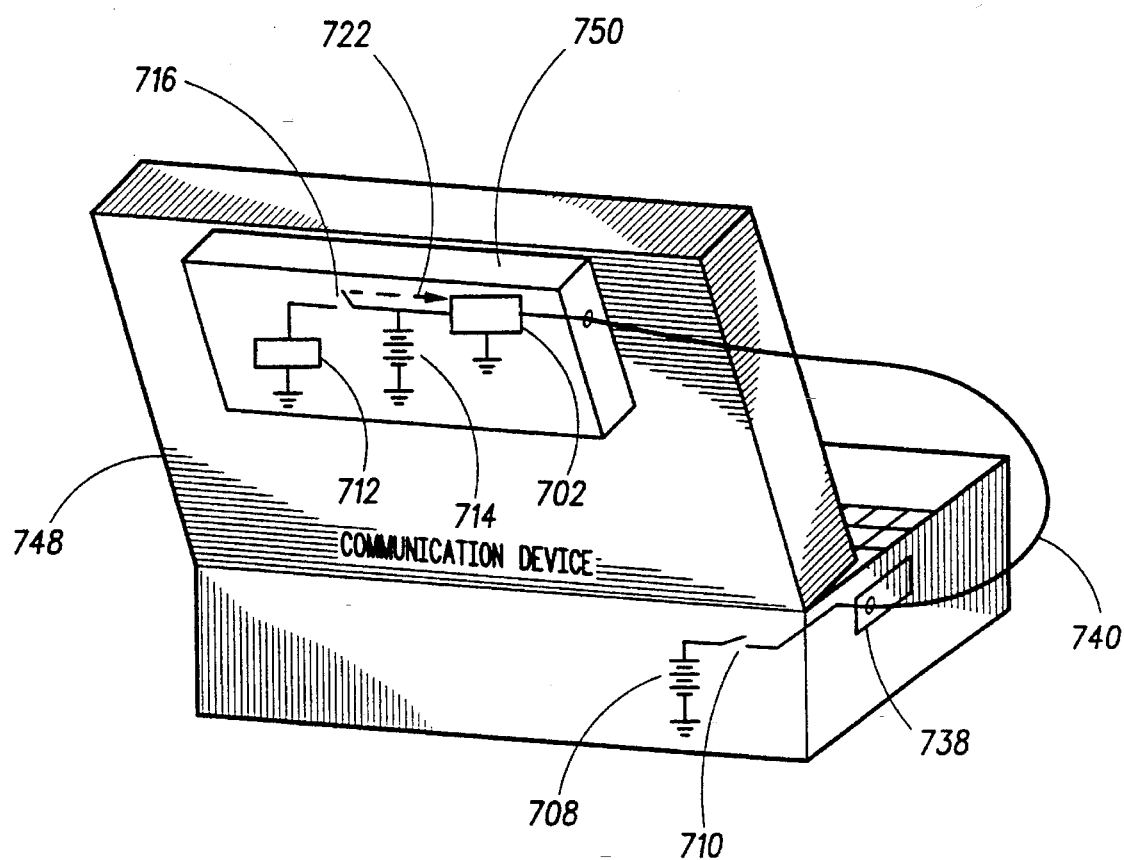
FIG. 7 is a diagram of one embodiment of a communication device comprising an apparatus for charging a battery in accordance with the present invention.

FIG. 7, numeral 700, is a diagram of one embodiment of a communication device comprising an apparatus for charging a battery in accordance with the present invention. A charger (702) contains the blocks described in the charger (402) in FIG. 4. A charge storage device (714) or battery undergoes charge and discharge cycles. A load (712) is presented to the battery during momentary transmissions. A switch (716) indicates the presence or absence of a load. A signal (722) senses the presence or absence of the load and is input to the charger (702). A wireless transceiver device (750) is depicts a typical application where a battery and a charger can be located. A portable computer (748) is used to provide wireless links to other users via the wireless transceiver device (750). A cable (740) provides the data and power links between the wireless transceiver (750) and the computer (748). This interface is accomplished through a PCMCIA adapter (738). The computer main power source (708) or primary battery is the voltage charging source used to charge the battery as described earlier. A switch (710) indicates the availability or absence of the charging voltage source. In typical portable computers, this switch opens up when the computer is turned off.

We claim:

1. A method for charging a charge storage device which is momentarily connected to a fixed load, the method comprising:

incrementing, using a counter, a count based on a discharge time, the discharge time occurring at a first predetermined rate when the charge storage device is connected to the fixed load;

initiating a charging at a second predetermined rate that is less than the first predetermined rate of the charge storage device for a charge time when the fixed load is disconnected, and the length of the charge time is based on the count;

decrementing the count during the charge time; and terminating the charging of the charge storage device when the count is zero.

2. The method of claim 1 wherein charging the charge storage device uses a primary battery.

3. The method of claim 1 wherein the charge storage device is a secondary battery.

4. The method of claim 1 wherein charging occurs when the fixed load is disconnected, the count is nonzero, and a charging voltage is available.

5. The method of claim 1 wherein the charge time is longer than the discharge time.

6. The method of claim 1 wherein a trickle charging occurs when the count equals zero.

7. The method of claim 1 further comprising a step of measuring the temperature of the charge storage device.

8. The method of claim 7 wherein charging the charge storage device is at a slower rate when the temperature of the charge storage device exceeds a predetermined threshold.

9. An apparatus for charging a charge storage device which is momentarily connected to a fixed load, the apparatus comprises:

a charging voltage source for providing a voltage signal;

a charge controller, powered by the voltage signal, for monitoring when the fixed load is connected to the charge storage device, and determining a direction and rate of a count;

a clock, operably coupled to the charge controller, for receiving the rate of the count and providing a clock signal;

a counter, operably coupled to the clock and the charge controller, for counting the cycles of the clock signal in the direction determined by the charge controller, wherein the counter increments a count based on a discharge time, the discharge time occurring at a first predetermined rate when the charge storage device is connected to the fixed load; and a charging current source, operably coupled to the charge controller and charging voltage source, for charging the charge storage device when the direction of count is decreasing, wherein the charging current source initiates a charge at a second predetermined rate that is less than the first predetermined rate of the charge storage device for a charge time when the fixed load is disconnected, and the length of the charge time is based on the count.

10. The apparatus according to claim 9, further comprising:

a trickle charge source, operably coupled to the charging voltage source and the charge controller, for replacing leakage current in the charge storage device when the count is stationary.

11. The apparatus according to claim 9, further comprising:

a temperature sensor, operably coupled to the charge storage device, for measuring the temperature of the charge storage device and inputting the temperature into the charge controller to be used in the determination of the rate of the count.

12. A communication device comprising an apparatus for charging a charge storage device which is momentarily connected to a fixed load, the apparatus comprises:

a charging voltage source for providing a voltage signal;

a charge controller, powered by the voltage signal, for monitoring when the fixed load is connected to the charge storage device, and determining a direction and rate of a count;

a clock, operably coupled to the charge controller, for receiving the rate of the count and providing a clock signal;

a counter, operably coupled to the clock and the charge controller, for counting the cycles of the clock signal in the direction determined by the charge controller,, wherein the counter increments a count based on a discharge time, the discharge time occurring at a first predetermined rate when the charge storage device is connected to the fixed load; and a charging current source, operably coupled to the charge controller and charging voltage source, for charging the charge storage device when the direction of count is decreasing, wherein the charging current source initiates a charge at a second predetermined rate that is less than the first predetermined rate of the charge storage device for a charge time when the fixed load is disconnected, and the length of the charge time is based on the count.

\* \* \* \* \*